US010298565B2

(12) United States Patent
Zhang

(10) Patent No.: US 10,298,565 B2
(45) Date of Patent: May 21, 2019

(54) METHOD AND APPARATUS FOR USER IDENTITY AUTHENTICATION

(71) Applicant: ALIBABA GROUP HOLDING LIMITED, George Town, Grand Cayman (KY)

(72) Inventor: Jie Zhang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 15/057,584

(22) Filed: Mar. 1, 2016

(65) Prior Publication Data
US 2016/0261583 A1 Sep. 8, 2016

(30) Foreign Application Priority Data

Mar. 3, 2015 (CN) .......................... 2015 1 0094744

(51) Int. Cl.
*H04L 29/06* (2006.01)
*G06F 21/36* (2013.01)
*H04L 9/08* (2006.01)
*H04L 9/32* (2006.01)

(52) U.S. Cl.
CPC ............ *H04L 63/083* (2013.01); *G06F 21/36* (2013.01); *H04L 63/06* (2013.01); *H04L 9/0863* (2013.01); *H04L 9/32* (2013.01)

(58) Field of Classification Search
CPC ... H04L 63/083; H04L 9/0861; H04L 9/0863; H04L 9/3226; G06F 21/36; G06F 21/45; G06F 21/46
See application file for complete search history.

(56) References Cited

U.S. PATENT DOCUMENTS

| 7,353,536 | B1* | 4/2008 | Morris | .................... | G06F 21/31 |
| | | | | | 709/203 |
| 7,925,015 | B2* | 4/2011 | Yasui | ................. | G03G 15/5091 |
| | | | | | 380/51 |
| 8,819,796 | B2* | 8/2014 | Kodama | ................. | G06F 21/31 |
| | | | | | 713/155 |
| 8,881,251 | B1* | 11/2014 | Hilger | .................. | H04L 63/083 |
| | | | | | 713/183 |

(Continued)

FOREIGN PATENT DOCUMENTS

| CN | 101118585 A | 2/2008 |
| CN | 101425191 A | 5/2009 |

(Continued)

OTHER PUBLICATIONS

W. Jansen, NIST, "Authenticating mobile device users through image selection",2004, The Internet Society: Advances in Learning, Commerce, and Security, p. 183-192.*

(Continued)

*Primary Examiner* — Nelson Giddins
(74) *Attorney, Agent, or Firm* — Finnegan, Henderson, Farabow, Garrett & Dunner, LLP

(57) ABSTRACT

A method for user identity authentication is provided. The method includes receiving an authentication image selected by a user, and acquiring, based on the authentication image, a password to be verified. The method may further include acquiring a preset verification password, and comparing the verification password with the password to be verified to obtain a user identity authentication result.

18 Claims, 5 Drawing Sheets

(56) References Cited

U.S. PATENT DOCUMENTS

| | | | |
|---|---|---|---|
| 9,288,202 B1* | 3/2016 | Felton | H04L 63/083 |
| 2004/0010721 A1* | 1/2004 | Kirovski | G06F 21/36 |
| | | | 713/183 |
| 2004/0230843 A1* | 11/2004 | Jansen | G06F 21/36 |
| | | | 726/7 |
| 2005/0235341 A1* | 10/2005 | Stieglitz | G06F 21/46 |
| | | | 726/5 |
| 2007/0050635 A1 | 3/2007 | Popp | |
| 2007/0226518 A1* | 9/2007 | Yasaki | G06F 21/575 |
| | | | 713/189 |
| 2008/0209224 A1* | 8/2008 | Lord | H04L 63/083 |
| | | | 713/185 |
| 2010/0287382 A1* | 11/2010 | Gyorffy | G06F 21/36 |
| | | | 713/185 |
| 2011/0016520 A1* | 1/2011 | Cohen | G06F 21/36 |
| | | | 726/19 |
| 2011/0023112 A1* | 1/2011 | Murai | G06F 21/36 |
| | | | 726/17 |
| 2011/0161232 A1* | 6/2011 | Brown | G06F 21/32 |
| | | | 705/71 |
| 2011/0291839 A1* | 12/2011 | Cole | G07C 9/00158 |
| | | | 340/573.1 |
| 2012/0011564 A1* | 1/2012 | Osborn | G06F 21/36 |
| | | | 726/2 |
| 2012/0023574 A1* | 1/2012 | Osborn | G06F 21/36 |
| | | | 726/19 |
| 2012/0036573 A1* | 2/2012 | Yang | G06F 21/34 |
| | | | 726/16 |
| 2012/0171997 A1 | 7/2012 | Knapp et al. | |
| 2014/0068754 A1* | 3/2014 | Burkill | G06F 21/36 |
| | | | 726/18 |
| 2014/0201831 A1* | 7/2014 | Yi | G06F 21/31 |
| | | | 726/19 |
| 2014/0372754 A1* | 12/2014 | Aissi | H04L 63/08 |
| | | | 713/168 |
| 2015/0178493 A1* | 6/2015 | Liu | G06F 21/45 |
| | | | 726/6 |
| 2015/0205942 A1* | 7/2015 | Yang | G06F 21/31 |
| | | | 726/19 |
| 2016/0020902 A1* | 1/2016 | Xu | H04L 9/0861 |
| | | | 380/44 |
| 2016/0050198 A1* | 2/2016 | Thibadeau, Sr. | H04L 63/0807 |
| | | | 726/6 |
| 2016/0057129 A1* | 2/2016 | Bailey, Jr. | G06F 21/36 |
| | | | 726/7 |
| 2016/0103991 A1* | 4/2016 | Hsu | G06F 21/34 |
| | | | 726/18 |
| 2016/0283708 A1* | 9/2016 | Getchius | G06F 21/36 |
| 2016/0294804 A1* | 10/2016 | Yamahara | H04L 63/083 |

FOREIGN PATENT DOCUMENTS

| | | | |
|---|---|---|---|
| CN | 101645121 A | 2/2010 | |
| CN | 101827360 A | 9/2010 | |
| CN | 102760042 A | 10/2012 | |
| CN | 104168360 A | 11/2014 | |
| EP | 2254071 | * 11/2010 | |
| EP | 2254071 A1 | * 11/2010 | G06F 21/00 |

OTHER PUBLICATIONS

PCT International Search Report and Written Opinion dated May 5, 2016, issued in corresponding International Application No. PCT/US16/20214 (9 pages).

First Chinese Office Action issued by the State Intellectual Property of the People's Republic of China in counterpart Chinese Application No. 201510094744.9 dated Jul. 23, 2018 (6 pages).

First Chinese Search Report issued by the State Intellectual Property Office of the People's Republic of China in counterpart Chinese Application No. 201510094744.9 dated Jul. 12, 2018 (1 page).

* cited by examiner

200

METHOD AND APPARATUS FOR USER IDENTITY AUTHENTICATION

CROSS-REFERENCE TO RELATED APPLICATION

This application is based upon and claims priority to Chinese Patent Application No. 201510094744.9, filed Mar. 3, 2015, the entire contents of which are incorporated herein by reference.

TECHNICAL FIELD

The present application relates to the technical field of network security and, more particularly, to a method and an apparatus for user identity authentication.

BACKGROUND

Conventionally, a terminal device performs user identity authentication by users manually inputting character strings, such as numbers and letters.

However, authentication passwords in the form of numbers and letters may not be memorized conveniently and therefore are often be forgotten by users. Moreover, the operation of inputting these passwords is relatively cumbersome.

SUMMARY

The present disclosure provides a method for user identity authentication. Consistent with some embodiments, the method includes receiving an authentication image selected by a user, and acquiring, based on the authentication image, a password to be verified. The method may further include acquiring a preset verification password, and comparing the verification password with the password to be verified to obtain a user identity authentication result.

Consistent with some embodiments, this disclosure provides an apparatus for user identity authentication. The apparatus includes a receiving module configured to receive an authentication image selected by a user and an acquiring module configured to acquire, based on the authentication image, a password to be verified. The apparatus may further include a verification module configured to acquire a preset verification password and compare the verification password with the password to be verified to obtain a user identity authentication result.

Consistent with some embodiments, this disclosure provides a non-transitory computer-readable storage medium having stored therein instructions. When executed by a processor in a device, the instructions cause the device to perform operations including receiving an authentication image selected by a user, acquiring, based on the authentication image, a password to be verified, acquiring a preset verification password, and comparing the verification password with the password to be verified to obtain a user identity authentication result.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Figure 1:
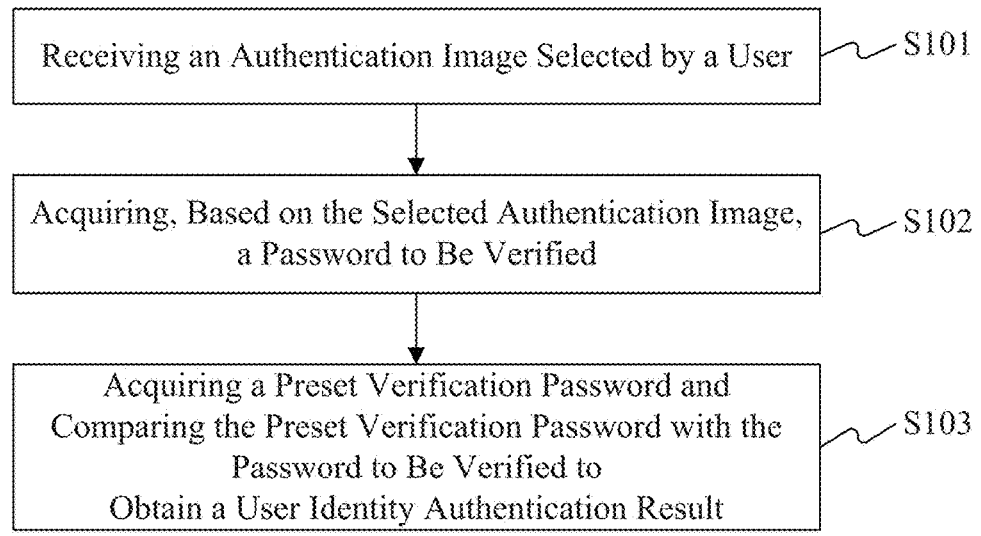
FIG. 1 is a flowchart of an exemplary method for user identity authentication, consistent with some embodiments of this disclosure.

FIG. 1 is a flowchart of an exemplary method 100 for user identity authentication, consistent with some embodiments of this disclosure. The exemplary method 100 may be performed by a terminal device. Referring to FIG. 1, the method 100 includes the following steps.

Figure 2:
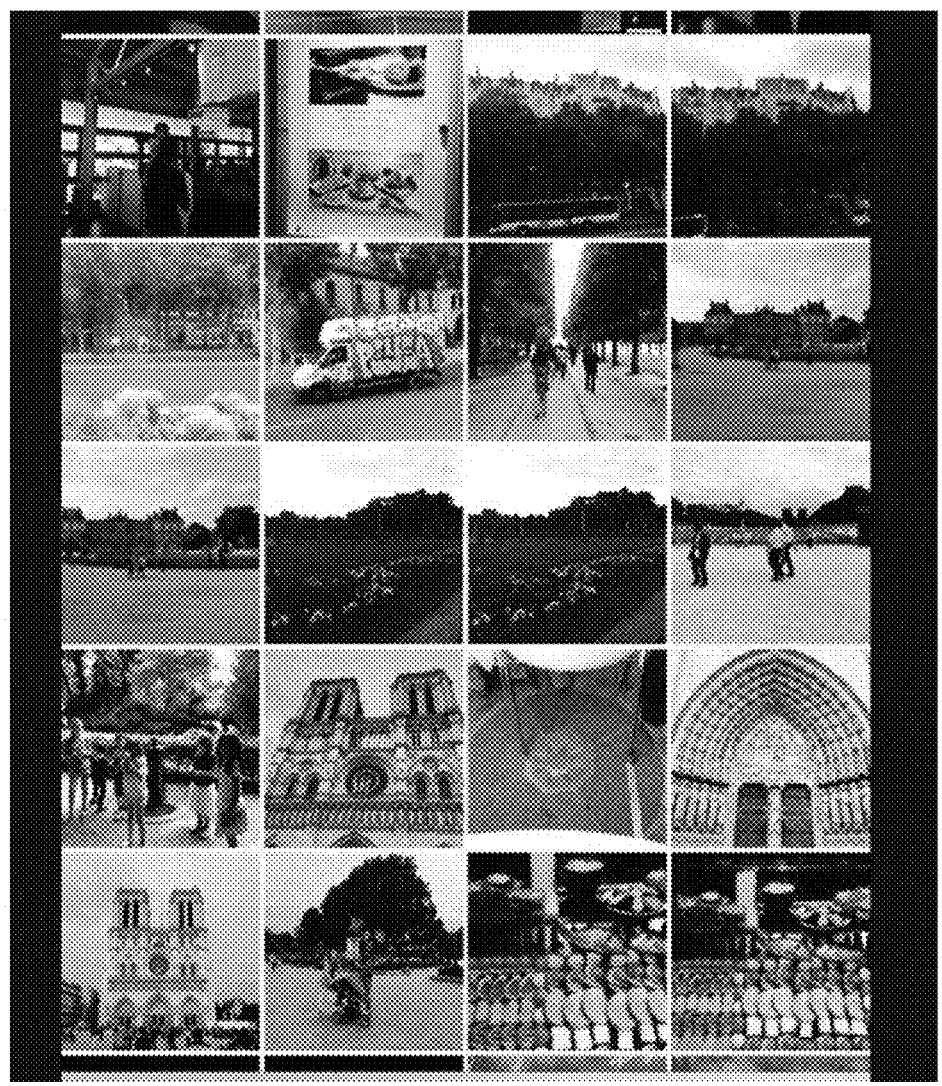
FIG. 2 is a schematic diagram of authentication images displayed to a user, consistent with some embodiments of this disclosure.

In step S101, the terminal device receives an authentication image selected by a user. FIG. 2 is a schematic diagram 200 of authentication images displayed to a user, consistent with some embodiments of this disclosure. For example, an application program of the terminal device may obtain a plurality of authentication images as selectable images and display them on a display of the terminal device. Subsequently, the user may select, from the displayed authentication images, the image preset as a password image so as to perform identity authentication.

In some embodiments, the authentication images may be randomly selected from all of the images stored in the terminal device and may be randomly arranged.

The image that is preset as a password image may be placed at a random position in authentication images. In some implementations, the password image may be placed at the first page or the first few pages of all authentication images so that a user may conveniently find the password image.

In step S102, the terminal device acquires, based on the selected authentication image, a password that is to be verified. For example, a password may be acquired by a preset algorithm according to an image selected by a user.

In some embodiments, the terminal device may acquire a pre-stored hash key and perform hash operation according to the hash key and the selected authentication image to obtain the password.

In some embodiments, before selecting the authentication image, the user may preset a verification password in advance. For example, an application program of the terminal device may obtain a plurality of images from a terminal device and display the images to a user in a randomly arranged manner so as to allow the user to select an image as a password image. The terminal device may then generate a random number as a hash key according to the password image, and generate a verification password by the hash key and a preset hash algorithm (e.g., SHA-256 algorithm and the like). The terminal device may then securely store the random number and the verification password in a secure storage area of the terminal device so that comparative verification may be performed when identity verification is required. For example, the operation of storing the random number and the verification password may be performed after detection by a preset secure detection program. A secure storage area, for example, may be a storage area where restriction or encryption of the access authority is implemented.

During verification of user identity, the terminal device may acquire the pre-stored random number as a hash key, and perform the hash operation according to the hash key and the authentication image selected by a user, thereby obtaining a password to be verified. The hash operation herein may be the same as the hash algorithm used when a verification password is set. In doing so, the password obtained by the same hash key may be the same as the preset verification password when the image selected by a user is the same as the preset password image.

In step S103, the terminal device acquires a preset verification password and compares the preset verification password with the password to be verified to obtain a user identity authentication result.

For example, a preset verification password may be acquired and then compared with a password to be verified. If the password to be verified is consistent with the preset verification password, identity authentication may be determined to be successful. Otherwise, identity authentication may be determined to fail.

In the method 100 described above, a password is generated according to an image selected by a user, and compared with a preset verification password to verify user identity. The user is required to select, from randomly arranged images, an image used when a verification password is set to complete identity authentication, thereby providing simple and convenient operation. Moreover, a password image may be memorized conveniently by the user.

Figure 3:
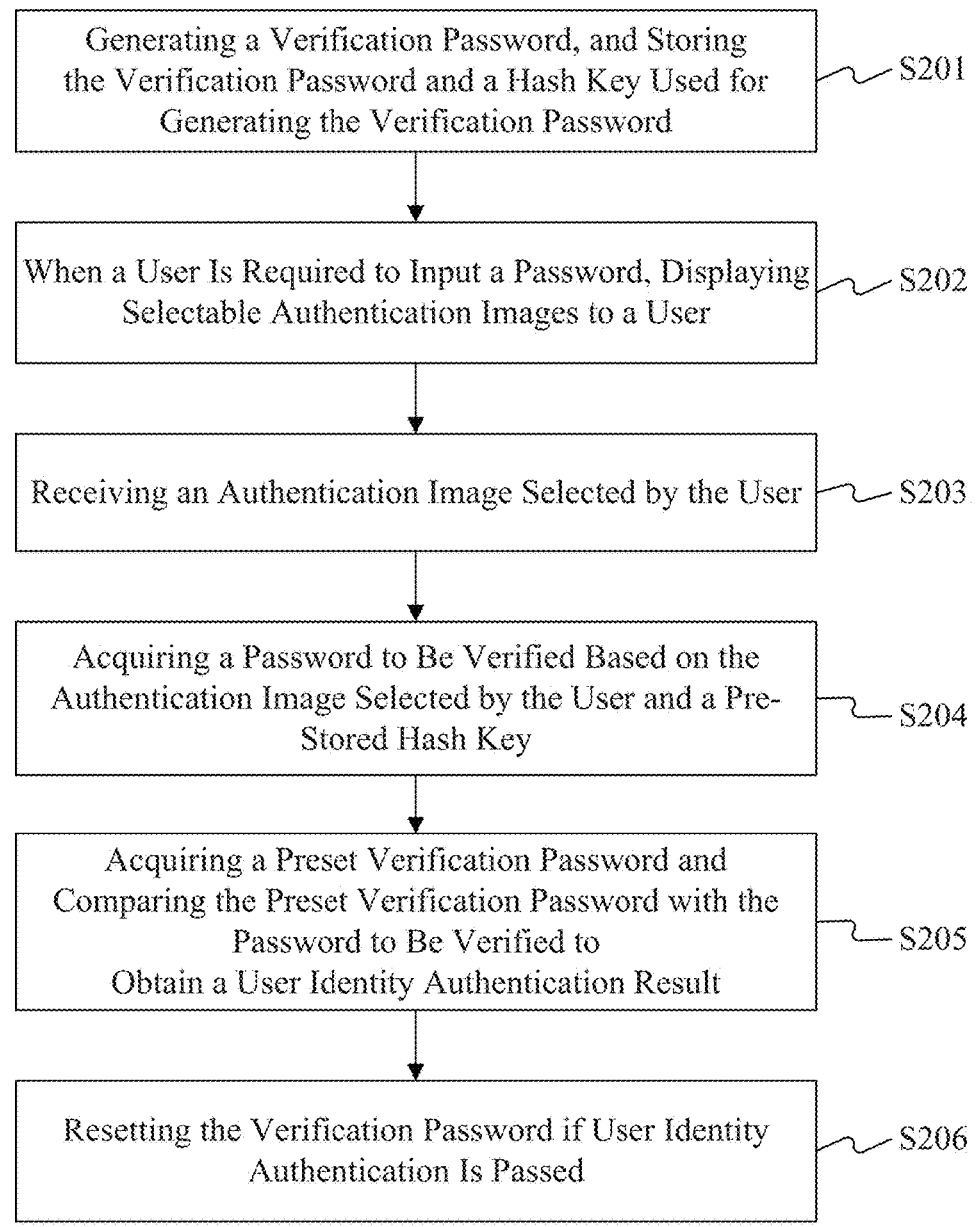
FIG. 3 is a flowchart of another exemplary method for user identity authentication, consistent with some embodiments of this disclosure.

FIG. 3 is a flowchart of another exemplary method 300 for user identity authentication, consistent with some embodiments of this disclosure. The exemplary method 300 may be performed by a terminal device. Referring to FIG. 3, the method 300 includes the following steps.

In step S201, the terminal device generates a verification password, and stores the verification password and a hash key used for generating the verification password.

For example, an application program may obtain a plurality of images from a terminal device and display the images to a user in a randomly arranged manner to allow the user to select one image as a password image. The application program may generate a random number according to the password image, use the random number as a hash key, and generate a verification password by the hash key and a preset hash algorithm (e.g., SHA-256 algorithm and the like). Subsequently, the application program may securely store the random number and the generated verification password in a secure storage area of the terminal device so that comparison may be performed when identity authentication is required.

The operation of storing the random number and the verification password may be performed after detection by a preset secure detection program. A secure storage area, for example, may be a storage area where restriction or encryption of the access authority is implemented. In addition, the random number and verification password may also be stored by an existing or possible future security technique, which is not intended to be limited by the present disclosure.

In step S202, when a user is required to input a password, the terminal device displays selectable authentication images to the user, so that the user may select an image from the displayed images. In some embodiments, the authentication images may be randomly selected from all images in the terminal device and may be randomly arranged on a display of the terminal device.

As shown in FIG. 2, an application program may obtain all images from a terminal device for random arrangement, or randomly select a subset of the images for arrangement as authentication images to a user, where the authentication images include a password image used for setting a verification password.

In some embodiments, the image preset as a password image may be placed at a random position in the authentication images. In other embodiments, the image preset as a password image may be placed at the first page or the first few pages of the authentication images so that a user may conveniently find the image.

In step S203, the terminal device receives an authentication image selected by the user. For example, a user may select the image preset as a password image from the authentication images to perform identity authentication.

In step S204, the terminal device acquires a password to be verified based on the authentication image selected by a user and a pre-stored hash key.

For example, a pre-stored random number may be acquired as a hash key, and a hash operation may be performed according to the hash key and the image, thereby obtaining the password to be verified. The hash operation herein may be the same as a hash algorithm used when a verification password is set, and thus a password to be verified may be the same as a preset verification password where an image selected by a user is the same as a password image used when a password is set.

In step S205, the terminal device acquires a preset verification password and compares the preset verification password with the password to be verified to obtain a user identity authentication result. If the password to be verified is consistent with the preset verification password, identity authentication may be determined to be successful. Otherwise, identity authentication may be determined to fail.

In some embodiments, a backup character string password may be preset. When a user forgets or deletes the image for verification, the user may be prompted to input a character string for verifying identity. Identity authentication may be performed according to a preset character string password, and the password image and the verification password may be reset after authentication is passed. For example, a password image may be reselected according to step S201, and an updated verification password may be generated. Other types of identity authentication methods, such as performing verification by other pre-bound devices, may also be used when a user fails to input a correct password image. Other alternative identity authentication methods known to a person skilled in the art will not be described herein.

In step S206, the terminal device resets the verification password if user identity authentication is passed.

When a user desires to change a password image, the user may be first required to pass the above identity authentication. After the authentication is passed, the user may start a password modification process. For example, the user may reselect a password image according to step S201 to update a verification password.

In the method 300 described above, a hash key and a verification password may be generated by a preset password image. In the course of verification, a password may be generated based on an authentication image selected by a user and a pre-stored hash key, and be compared with a preset verification password to verify user identity. The user is required to select, from randomly arranged authentication images, an authentication image used when a verification password is set to complete identity authentication, thereby providing simple and convenient operation. Moreover, a password image may be memorized conveniently by the user. Further, selectable authentication images may be randomly arranged in the course of verification, so as to prevent viruses such as Trojan horses from probing the user input, thereby improving the password security. In addition, when a user forgets a password image or the password image is deleted, identity authentication may also be performed by other alternative methods so that a verification password may be reset, thereby improving the identity authentication efficiency.

Figure 4:
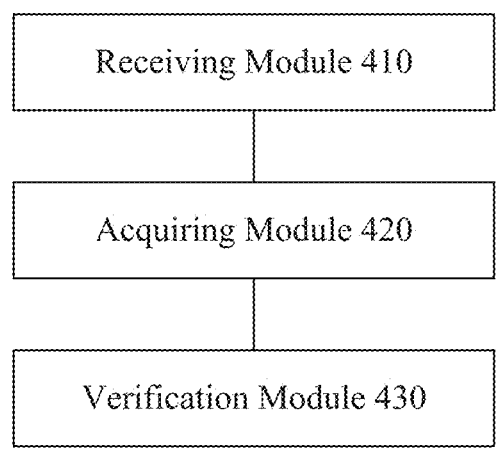
FIG. 4 is a block diagram of an exemplary apparatus for user identity authentication, consistent with some embodiments of this disclosure.

FIG. 4 is a block diagram of an exemplary apparatus 400 for user identity authentication, consistent with some embodiments of this disclosure. Referring to FIG. 4, the apparatus 400 includes a receiving module 410, an acquiring module 420, and a verification module 430.

The receiving module 410 is configured to receive an authentication image selected by a user. For example, as shown in FIG. 2, authentication images may be obtained from a terminal device by an application program. The obtained images may be used as authentication images which are then displayed to a user (e.g., on a display of the terminal device), and the user may select the authentication image that is preset as a password image from the displayed images to perform identity authentication.

In some embodiments, the authentication images may be randomly selected from all images stored in a terminal device and may be randomly arranged on a display of the terminal device.

The authentication image preset as a password image may be placed at a random position in the displayed images. In some implementations, the password image may be placed at the first page or the first few pages of all displayed authentication images so that a user may conveniently find the image.

The acquiring module 420 is configured to acquire a password to be verified based on the selected authentication image. In some embodiments, the acquiring module 420 may acquire a pre-stored random number as a hash key, and perform a hash operation based on the hash key and the image selected by a user, thereby obtaining a password to be verified.

The verification module 430 is configured to acquire a preset verification password and compare the preset verification password with the password to be verified to obtain a user identity authentication result. If the password to be verified is consistent with the preset verification password, the verification module 430 may determine the identity authentication to be successful. Otherwise, the verification module 430 may determine the identity authentication to fail.

Figure 5:
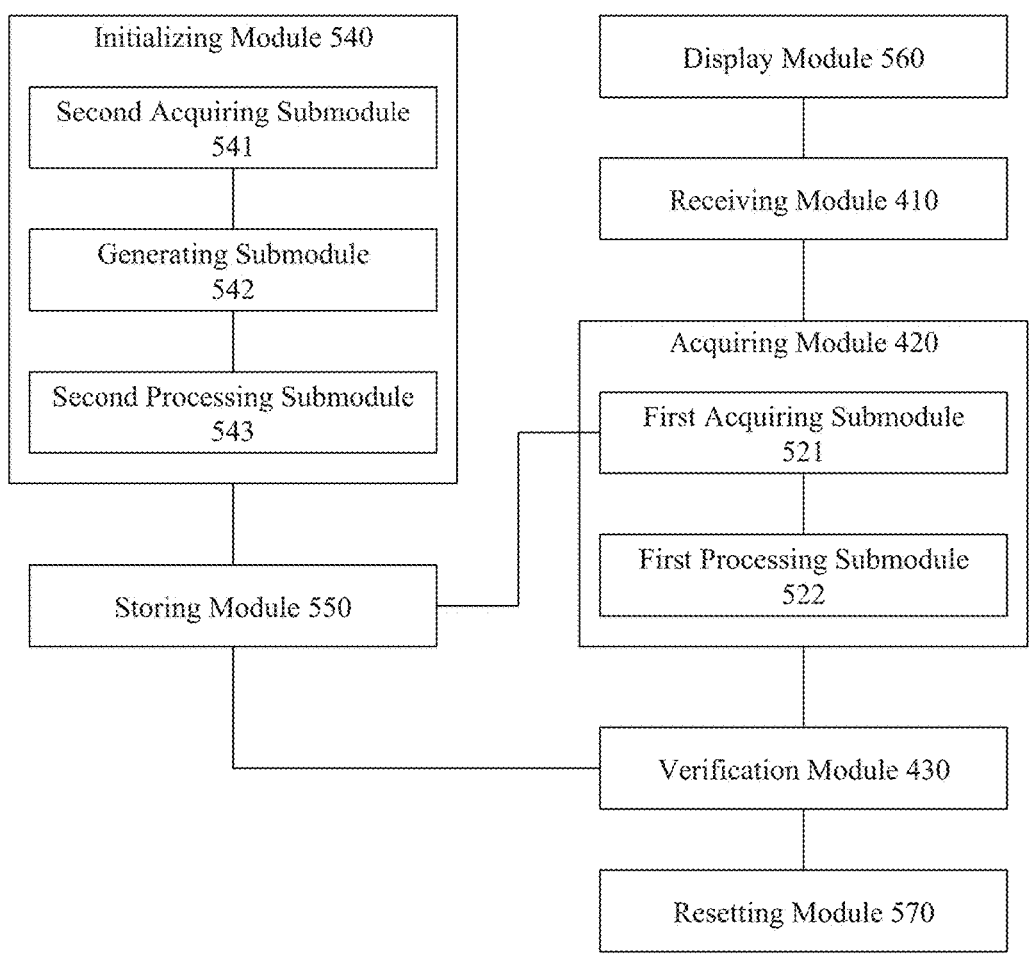
FIG. 5 is a block diagram of another exemplary apparatus for user identity authentication, consistent with some embodiments of this disclosure.

FIG. 5 is a block diagram of another exemplary apparatus 500 for user identity authentication, consistent with some embodiments of this disclosure. Referring to FIG. 5, the apparatus 500 includes a receiving module 410, an acquiring module 420, a verification module 430, an initializing module 540, a storing module 550, a display module 560, and a resetting module 570. The acquiring module 420 includes a first acquiring submodule 521 and a first processing submodule 522.

The initializing module 540 is configured to set the verification password. As shown in FIG. 5, the initializing module 540 includes a second acquiring submodule 541, a generating submodule 542, and a second processing submodule 543. The second acquiring submodule 541 is configured to acquire an authentication image selected by a user for verification. The generating submodule 542 is configured to generate a random number. The second processing submodule 543 is configured to use the random number as a hash key, and perform a hash operation based on the hash key and the authentication image selected by the user to obtain a verification password.

In some embodiments, an application program may obtain all images from a terminal device and display the images to a user in a randomly arranged manner to allow the user to select one image as a password image. The generating submodule 542 may be configured to generate a random number according to the password image. The second processing submodule 543 may be configured to use the random number as a hash key, and generate a verification password by the hash key and a preset hash algorithm (e.g., SHA-256 algorithm and the like).

The storing module 550 is configured to store the random number and the verification password. The storing module 550 may be configured to securely store the random number and the generated verification password in a secure storage area of the terminal device, so that comparison may be performed for identity authentication.

The operation of storing the random number and the verification password may be performed after detection by a preset secure detection program. A secure storage area, for example, may be a storage area where restriction or encryption of the access authority is implemented. In addition, the random number and verification password may also be stored by an existing or possible future security technique, which is not intended to be limited by the present disclosure.

The display module 560 is configured to display selectable authentication images to a user when the user is required to input a password, so that the user may select an authentication image from the displayed images. The authentication images may be randomly selected from a subset of or all images in the terminal device and may be randomly arranged. As shown in FIG. 2, the display module 560 may obtain all images from a terminal device for random arrangement, or randomly select a subset of the images for arrangement as authentication images which are then displayed to a user, where the authentication images include a password image used for setting a verification password.

In some embodiments, the display module 560 may be configured to place the image preset as a password image at a random position in the displayed images. In other embodiments, the image preset as a password image may be placed at the first page or the first few pages of the authentication images so that a user may conveniently find the image.

In some embodiments, the authentication images may be transmitted in real time via networks, such as mobile data networks, WiFi, Bluetooth, infrared transmission, and so on. In some embodiments, when authentication images are transmitted in real time via networks, the source of the authentication images may be designated by users. A terminal device may be configured to start a corresponding function for receiving the network images. For example, a user may enable an image receiving function of the terminal device, such that images may be transmitted in real time via the mobile data network.

The first acquiring submodule 521 is configured to acquire a pre-stored hash key after receiving an authentication image selected by a user. The first processing submodule 522 is configured to perform a hash operation according to the hash key and the received image to obtain the password to be verified. The hash operation may be the same as a hash algorithm used for setting the verification password, such that a password to be verified may be the same as the preset verification password when the authentication image selected by a user is the same as the password image used to set the verification password.

The resetting module 570 is configured to reset the verification password after user identity authentication is passed. When a user desires to replace a password image, the user may be first required to pass the above identity authentication. After the authentication is passed, the resetting module 570 may be configured to start a password modification process and prompt the user to reselect a password image so as to update a verification password.

In some embodiments, a backup character string password may be preset. When a user forgets or deletes the password image, the verification module 430 may be configured to authenticate the user according to a preset character string, and reset the verification password after authentication is passed. Other types of identity authentication methods, such as performing verification by other pre-bound devices, may also be used when a user fails to input a correct password image. Other alternative identity authentication methods known to a person skilled in the art will not be described herein.

In exemplary embodiments, a non-transitory computer-readable storage medium including instructions is also provided, and the instructions may be executed by a device (such as a client terminal, a personal computer, or the like), for performing the above-described methods. The above-described methods may be implemented in a distributed computing environment, where one or more steps may be executed by a remote processing device connected through a network. The instructions executable by a device for performing the above-described methods may be stored in a local non-transitory computer-readable storage medium or in a computer-readable storage medium located in a remote device.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

The illustrated steps in the above-described figures are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments.

One of ordinary skill in the art will understand that the above described embodiments may be implemented by hardware, or software (program codes), or a combination of hardware and software. If implemented by software, it may be stored in the above-described computer-readable media. The software, when executed by the processor may perform the disclosed methods. If implemented by hardware, the above described embodiments may be implemented by one of the following techniques known in the art or a combination thereof: a discrete logic circuit having a logic gate circuit for realizing a logic function of a data signal, an application specific integrated circuit having an appropriate combination logic gate circuit, a programmable gate array (PGA), a field programmable gate array (FPGA), etc. The computing units and the other functional units described in this disclosure may be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes may be made without departing from the scope thereof. It is intended that the scope of the invention should only be limited by the appended claims.

What is claimed is:

1. A method for user identity authentication, comprising:
    selecting, by a terminal device, a plurality of authentication images from images stored in the terminal device;
    displaying the plurality of authentication images on a display of the terminal device, wherein the plurality of authentication images are displayed in a plurality of pages on the display, and the plurality of authentication images includes a preset password image placed at a first page of the plurality of pages;
    receiving, by the terminal device, an authentication image selected by a user;
    acquiring, by the terminal device, a password to be verified based on the authentication image and a hash key generated when setting a preset verification password, wherein the hash key is generated based on the preset password image;

comparing, by the terminal device, the preset verification password with the password to be verified to obtain a user identity authentication result;

responsive to the user identity authentication result indicating that identity authentication fails, prompting, by the terminal device, the user to input a character string and authenticating, by the terminal device, the user according to a preset character string password; and responsive to the preset password image being deleted from the terminal device, prompting, by the terminal device, the user to input the character string, and determining, by the terminal device, a new password image after the user is authenticated according to the preset character string password.

2. The method of claim 1, wherein acquiring the password to be verified comprises:

performing a hash operation based on the hash key and the authentication image to obtain the password to be verified.

3. The method of claim 1, further comprising setting the preset verification password before receiving the authentication image.

4. The method of claim 3, wherein setting the preset verification password comprises:

acquiring a password image selected by the user as the preset password image;

generating a random number as the hash key; and performing a hash operation according to the hash key and the password image to obtain the preset verification password.

5. The method of claim 1, further comprising:

after obtaining the user identity authentication result, resetting the preset verification password if user identity authentication is passed.

6. The method of claim 1, further comprising:

resetting the preset verification password after authentication is passed.

7. An apparatus for user identity authentication, comprising:

a display module configured to display a plurality of authentication images on a display of a terminal device, wherein the plurality of authentication images are selected, by the terminal device, from images stored in the terminal device, and wherein the plurality of authentication images are displayed in a plurality of pages on the display, and the plurality of authentication images includes a preset password image placed at a first page of the plurality of pages;

a receiving module configured to receive an authentication image selected by a user;

an acquiring module configured to acquire, based on the authentication image and a hash key generated when setting a preset verification password, a password to be verified, wherein the hash key is generated based on the preset password image; and a verification module configured to:

compare the preset verification password with the password to be verified to obtain a user identity authentication result;

if the user identity authentication result indicates that identity authentication fails, prompt the user to input a character string and authenticating the user according to a preset character string password; and if the preset password image is deleted from the terminal device, prompt the user to input the character string, and determine a new password image after the user is authenticated according to the preset character string password.

8. The apparatus of claim 7, wherein the acquiring module comprises:

a first processing submodule configured to perform a hash operation based on the hash key and the authentication image to obtain the password to be verified.

9. The apparatus of claim 7, further comprising an initializing module configured to set the preset verification password before receiving the authentication image.

10. The apparatus of claim 9, wherein the initializing module comprises:

a second acquiring submodule configured to acquire a password image selected by the user as the preset password image;

a generating submodule configured to generate a random number as the hash key; and a second processing submodule configured to perform a hash operation according to the hash key and the password image to obtain the preset verification password.

11. The apparatus of claim 7, further comprising a resetting module configured to: after obtaining the user identity authentication result, reset the preset verification password if user identity authentication is passed.

12. The apparatus of claim 7, wherein the verification module is further configured to reset the preset verification password after authentication is passed.

13. A non-transitory computer-readable storage medium having stored therein instructions that, when executed by a processor in a terminal device, cause the terminal device to perform operations including:

selecting, by the terminal device, a plurality of authentication images from images stored in the terminal device;

displaying the authentication images on a display of the terminal device, wherein the plurality of authentication images are displayed in a plurality of pages on the display, and the plurality of authentication images includes a preset password image placed at a first page of the plurality of pages;

receiving, by the terminal device, an authentication image selected by a user;

acquiring, by the terminal device, a password to be verified based on the authentication image and a hash key generated when setting a preset verification password, wherein the hash key is generated based on the preset password image;

comparing, by the terminal device, the preset verification password with the password to be verified to obtain a user identity authentication result;

if the user identity authentication result indicates that identity authentication fails, prompting, by the terminal device, the user to input a character string and authenticating, by the terminal device, the user according to a preset character string password; and if the preset password image is deleted from the terminal device, prompting, by the terminal device, the user to input the character string, and determining, by the terminal device, a new password image after the user is authenticated according to the preset character string password.

14. The non-transitory computer-readable storage medium of claim 13, wherein acquiring the password to be verified comprises:
   performing a hash operation based on the hash key and the authentication image to obtain the password to be verified.

15. The non-transitory computer-readable storage medium of claim 13, wherein the operations further comprise setting the preset verification password before receiving the authentication image.

16. The non-transitory computer-readable storage medium of claim 15, wherein setting the preset verification password comprises:
   acquiring a password image selected by the user as the preset password image;
   generating a random number as the hash key; and
   performing a hash operation according to the hash key and the password image to obtain the verification password.

17. The non-transitory computer-readable storage medium of claim 13, wherein the operations further comprise:
   after obtaining the user identity authentication result, resetting the preset verification password if user identity authentication is passed.

18. The non-transitory computer-readable storage medium of claim 13, wherein the operations further comprise:
   resetting the preset verification password after authentication is passed.

* * * * *

UNITED STATES PATENT AND TRADEMARK OFFICE
CERTIFICATE OF CORRECTION

PATENT NO. : 10,298,565 B2
APPLICATION NO. : 15/057584
DATED : May 21, 2019
INVENTOR(S) : Jie Zhang It is certified that error appears in the above-identified patent and that said Letters Patent is hereby corrected as shown below:

On the Title Page

Item (30), "2015 1 0094744" should read as --201510094744.9--

Signed and Sealed this
Tenth Day of September, 2019

Andrei Iancu
*Director of the United States Patent and Trademark Office*